United States Patent
Denninghoff

(10) Patent No.: US 7,283,548 B2
(45) Date of Patent: Oct. 16, 2007

(54) DYNAMIC LATENCY MANAGEMENT FOR IP TELEPHONY

(75) Inventor: Karl L. Denninghoff, Bothell, WA (US)

(73) Assignee: Intel Corporation, Santa Clara, CA (US)

( * ) Notice: Subject to any disclaimer, the term of this patent is extended or adjusted under 35 U.S.C. 154(b) by 1082 days.

(21) Appl. No.: 10/064,091

(22) Filed: Jun. 10, 2002

(65) Prior Publication Data

US 2003/0021285 A1 Jan. 30, 2003

Related U.S. Application Data

(60) Provisional application No. 60/297,119, filed on Jun. 9, 2001.

(51) Int. Cl.
*H04L 12/56* (2006.01)
*H04L 12/66* (2006.01)

(52) U.S. Cl. .................................... 370/412
(58) Field of Classification Search ............... 370/412, 370/428, 230, 417
See application file for complete search history.

(56) References Cited

U.S. PATENT DOCUMENTS

| | | |
|---|---|---|
| 5,867,482 A | 2/1999 | Kobayashi |
| 6,259,677 B1 * | 7/2001 | Jain ........................... 370/252 |
| 6,259,695 B1 | 7/2001 | Ofek |
| 6,304,574 B1 | 10/2001 | Schoo et al. |
| 6,341,134 B1 | 1/2002 | Toutain et al. |
| 6,363,065 B1 | 3/2002 | Thornton et al. |
| 6,665,728 B1 * | 12/2003 | Graumann et al. ......... 709/232 |
| 6,735,192 B1 * | 5/2004 | Fried et al. .................. 370/352 |
| 6,785,230 B1 | 8/2004 | Ogata et al. |
| 6,859,460 B1 * | 2/2005 | Chen ........................... 370/412 |

OTHER PUBLICATIONS

PCT international Search Report dated Aug. 30, 2002. (Serial No. PCT/US02/18401).

* cited by examiner

*Primary Examiner*—Derrick W. Ferris
(74) *Attorney, Agent, or Firm*—Blakely, Sokoloff, Taylor & Zafman LLP

(57) ABSTRACT

A method for dynamically reducing latency over a communications network independent of the Real Time Protocol. The method including determining the completion of processing of a next data block and the determination of the number of samples remaining in a queue of a consuming device of the next data block. Without knowing the latency of the system a determination is made on the variability based on the number of samples remaining in the queue of the consuming device. A determination is then made as to whether the remaining number of samples in the queue of the consuming device can be reduced based upon the variability and if so reducing the queue of the consuming device.

42 Claims, 9 Drawing Sheets

DYNAMIC LATENCY MANAGEMENT FOR IP TELEPHONY

CROSS REFERENCE TO RELATED APPLICATIONS

This application claims priority under 35 U.S.C. § 119(e) to provisional application No. 60/297,119, filed Jun. 9, 2001, entitled 'Web Page Interface Systems and Method,' which is hereby fully incorporated by reference.

BACKGROUND OF THE INVENTION

1. Field of the Invention

The present invention relates to voice over the internet (VoIP) telephony latency, and more particularly to a management technique method for reducing latency in VoIP telephony.

2. Description of the Related Art

The science of translating sound into electrical signals, transmitting them, and then converting them back to sound is called Telephony (i.e. the science of phones).

The term is used frequently to refer to computer hardware and software that performs functions traditionally performed by telephone equipment.

Internet telephony generally refers to communications services voice, facsimile, and/or voice-messaging applications that are transported via the Internet, rather than the public switched telephone network (PSTN). The basic steps involved in originating an Internet telephone call are conversion of the analog voice signal to digital format and compression/translation of the signal into Internet protocol (IP) packets for transmission over the Internet; the process is reversed at the receiving end as shown in prior art FIG. 1.

Real Time Transport Protocol (RTP) has gained widespread acceptance as the transport protocol for voice and video on the Internet. It provides services such as timestamping, sequence numbering, and payload identification. It also contains a control component, the Real Time Control Protocol (RTCP), which is used for loose session control, QoS reporting and media synchronization, among other functions.

RTP itself does not guarantee real-time delivery of data, but it does provide mechanisms for the sending and receiving applications to support streaming data. Typically, RTP runs on top of a User Datagram Protocol (UDP), although the specification is general enough to support other transport protocols. The RTP labels all information transferred by a sender with a timestamp. By examining the timestamps the receiver is able to sort the packets in the original order and synchronize real time streams and/or compensate jitter in audio or video data.

The RTCP was devised to give applications a status on the quality of a network. With this information parameters affecting the transmission of data, e.g. a jitter buffer size, can be optimized. The RTP header adds 16 bytes to the total overhead, and is prefixed by the UDP's additional 8 bytes of header information. The IP header, which is 20 bytes in size, is prefixed to form a datagram, thus, to transmit 20 bytes of audio or video as a 64-byte datagram is required. A datagram is defined to be a data block, segment, chunk, data packet or packet of audio, video or audio/video.

Within those unneeded bits of the RTP header is 32 bits of timestamp. This timestamp is in particular not needed because a sound packet is sequenced, and since it also translates to a specific number of sound samples it is possible to calculate precisely what the interarrival time should have been (and would have been without jitter). The timestamp is allowed to correlate directly with sample counts, in some implementations, and if it is used that way this value may be entirely redundant as it is directly calculable from the sequence number of the packet if the packets carry a fixed payload.

Latency, the delay in shipping a datagram from sender to receiver, affects the pace of the conversation. Humans can tolerate about 250 milliseconds (ms) of latency before it has a noticeable effect.

To support voice in its native analog form over a digital network, the analog signal has to be coded (i.e., converted) into a digital format at some point after being generated to enter the WAN, LAN, Internet or communication network. On the receiving end, the digital signal has to be decoded (i.e., reconverted) back into an analog format in order to be intelligible to the human ear, thus timing is critical. The network must be in a position to accept, switch, transport, and deliver every voice byte precisely every 125 ms. That means that latency (i.e., delay) must be minimal and jitter (i.e., variability in delay) must be virtually zero.

Real-time voice conversations are delay sensitive. Once the one-way delay exceeds a quarter of a second—250 milliseconds (ms)—it becomes relatively difficult for the parties in a conversation to tell when one person is finished speaking. This increases the probability that the parties will talk at the same time.

A voice call is routed from the PBX at its origination—via the gateway, LAN, and router at that location—through the IP network to a telephone connected to the PBX at its destination. There are several areas where datagrams transporting voice could be delayed. As an analog voice conversation is routed through the PBX to the voice gateway, the voice-coding algorithm used by the gateway adds a degree of latency. The actual amount of delay is based on the type of voice coder used. Once a small sample of voice is coded, it must be encapsulated within a datagram for transmission to a distant gateway. The encapsulation process includes adding applicable UDP and headers to form the datagram as well as the flow of the datagram from the gateway to the router via the LAN.

The total delay from those activities represents an interprocess time at the origin and an interprocess delay at the destination.

Once the datagram reaches the IP network, it will be routed through one or more routers to a network egress point. This routing also adds variable delay. The causes for the variable delay include the number of routers in the path from the point of entry to the point of exit, the processing power of each router, and the traffic load offered to each router. These delays occur as the voice-transporting datagram flows through the local network and contributes to the delay encountered by the datagram as it flows through the wide-area IP network.

However, the RTCP (Real Time Control Protocol) which sends few packets comparatively in a stream (most are RTP packets), provides for periodic correlation between the timestamps of the RTP and a real-time time clock stamp. This allows calculation of actual latencies and the like, provided that the real-time clocks on the sender and receiver are synchronized. This synchronization of real-time clocks is contemplated in the RTP specification via a separate protocol called Network Time Protocol (NTP). Alternately, one-way latency is determined as half the round-trip time of some information. Nevertheless, neither of these establish the one-way latency effectively since latency can be extremely asymmetrical between two network nodes.

Since none of the RTP information is needed to effectively reduce latency in the system, in order to most efficiently optimize the latency it is unnecessary to actually know what the latency is. The length of the path to an endpoint either in milliseconds or in hops or miles is irrelevant for the purpose of minimizing the latency. What is necessary is to minimize the length of the jitter buffer on the receiving end based upon statistics obtained entirely by observing the length of the jitter buffer. The length of the jitter buffer is observed at the time that each data block of sound is ready and prepared for insertion into the jitter buffer, which takes into account all contributors to the latency including the decompression and formatting of the sound on the receiving end.

What is needed is a method for reducing latency that is not dependent on the Real Time Protocol.

What is also needed is a method for reducing overhead cost of transmitting data packets.

What is further needed is a method to correct for bias in consuming devices of the data blocks.

What is additionally needed is a method to eliminate effects of time clock inaccuracies and differences in minimizing the actual latency of the system.

SUMMARY OF INVENTION

The present invention has been made in view of the above circumstances and has as an aspect of the present invention a method for dynamically reducing latency over a communications network.

A further aspect of the present invention is a system for dynamically reducing latency over a communications network.

An additional aspect of the present invention can be characterized as a system for dynamically reducing latency over a communications network.

A still further aspect of the present invention can be characterized as a software product for dynamically reducing latency over a communications network.

An additional aspect of the present invention is an audio and video consuming apparatus capable of dynamically reducing latency of data blocks received from a communications network.

Another aspect of the present invention can be characterized as a method for determining bias in an audio/video consuming device.

Additional aspects and advantages of the invention will be set forth in part in the description which follows, and in part will be obvious from the description, or may be learned by practice of the invention. The aspects and advantages of the invention will be realized and attained by means of the elements and combinations particularly pointed out in the appended claims.

To achieve these and other advantages and in accordance with the purpose of the present invention, as embodied and broadly described, the present invention can be characterized according to one aspect as a method for dynamically reducing latency over a communications network, the method including determining the completion of processing of a next data block and a determination of the number of samples remaining in a queue of a consuming device of the next data block. The method further includes determining variability in the number of samples remaining in the queue of the consuming device and determining if the remaining number of samples in the queue of the consuming device can be reduced based upon the variability and if so reduce the queue.

A further aspect of the present invention can be characterized as a system for dynamically reducing latency over a communications network, the system including means for determining the completion of processing of a next data block and means for determining the number of samples remaining in a queue of a consuming device of the next data block. The system further includes means for determining variability in number of samples remaining in the queue of the consuming device and means for determining if the remaining number of samples in the queue of the consuming device can be reduced based upon the variability and if so reduce the queue.

An additional aspect of the present invention can be characterized as a system for dynamically reducing latency over a communications network, the system including identifying when a data block is ready to be added to a queue of a consuming device and polling the consuming device and calculating number of samples consumed by the consuming device since previous polling of the consuming device. The system further includes calculating the variability in the number of samples consumed by the consuming device and determining if the remaining number of samples in the queue of the consuming device can be reduced based upon the variability and if so reducing the queue.

A still further aspect of the present invention can be characterized as a software product for dynamically reducing latency over a communications network, the software product residing on a computer readable medium capable of instructing a processor to perform instructions to determine the completion of processing of a next data block and to determine the number of samples remaining in a queue of a consuming device of the next data block. The software product further instructs the processor to determine the variability in number of samples remaining in the queue of the consuming device; and to determine if the remaining number of samples in the queue of the consuming device can be reduced based upon the variability and if so reducing the queue.

An audio and video consuming apparatus capable of dynamically reducing latency of data blocks received from a communications network, the apparatus including a processor, wherein the processor includes a memory and peripherals in communication with and controlled by the processor. The apparatus is capable of at least one of sending, receiving and consuming data blocks. The apparatus also including a software product, wherein the software product is capable of instructing the processor to execute instructions to:

a) determine completion of processing of a next data block; b) determine a number of samples remaining in a queue of said consuming apparatus of the next data block; c) determine variability in the number of samples remaining in the queue of said consuming apparatus; and d) determine if the remaining number of samples in the queue of said consuming apparatus can be reduced based upon the variability.

Another aspect of the present invention can be characterized as a method for determining bias in an audio/video consuming device, the method including polling a consuming device for number of samples consumed between a plurality of time intervals; and comparing the number of samples consumed to a calculated number of samples that should have been consumed between the plurality of time intervals based on the consuming device set consumption rate.

Latency has traditionally been a difficult challenge to overcome in the telecommunications field. Latency can have a deleterious effect on network systems, and other broadband technologies, such as voice over IP (VoIP), where near real-time results are very important to achieve. The present invention affords a solution for dynamically managing latency for IP telephony that overcomes the above enumerated disadvantages of prior art solutions.

It is to be understood that both the foregoing general description and the following detailed description are exemplary and explanatory only and are not restrictive of the invention, as claimed.

BRIEF DESCRIPTION OF DRAWINGS

The accompanying drawings, which are incorporated in and constitute a part of this specification, illustrate several embodiments of the invention and together with the description, serve to explain the principles of the invention.

DETAILED DESCRIPTION

Figure 1:
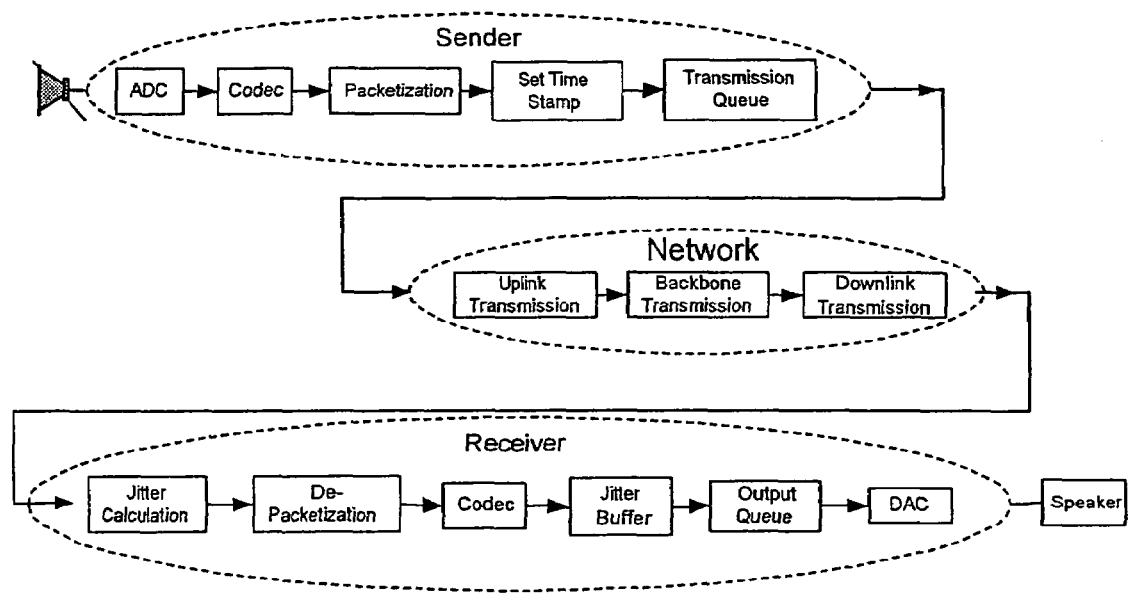
FIG. 1 illustrates a Prior Art system of an IP Telephony transmission system.

Reference will now be made in detail to the present embodiments of the invention, examples of which are illustrated in the accompanying drawings. Wherever possible, the same reference numbers will be used throughout the drawings to refer to the same or like parts (elements).

In accordance with the invention, the present invention can be characterized as a method for dynamically reducing latency over a communications network, the method including determining the completion of processing of a next data block and a determination of the number of samples remaining in a queue of a consuming device of the next data block. The method further includes determining variability in the number of samples remaining in the queue of the consuming device and determining if the remaining number of samples in the queue of the consuming device can be reduced based upon the variability and if so reduce the queue.

A further aspect of the present invention can be characterized as a system for dynamically reducing latency over a communications network, the system including means for determining the completion of processing of a next data block and means for determining the number of samples remaining in a queue of a consuming device of the next data block. The system further includes means for determining variability in number of samples remaining in the queue of the consuming device and means for determining if the remaining number of samples in the queue of the consuming device can be reduced based upon the variability and if so reduce the queue.

An additional aspect of the present invention can be characterized as a system for dynamically reducing latency over a communications network, the system including identifying when a data block is ready to be added to a queue of a consuming device and polling the consuming device and calculating number of samples consumed by the consuming device since previous polling of the consuming device. The system further includes calculating the variability in the number of samples consumed by the consuming device and determining if the remaining number of samples in the queue of the consuming device can be reduced based upon the variability and if so reducing the queue.

A still further aspect of the present invention can be characterized as a software product for dynamically reducing latency over a communications network, the software product residing on a computer readable medium capable of instructing a processor to perform instructions to determine the completion of processing of a next data block and to determine the number of samples remaining in a queue of a consuming device of the next data block. The software product further instructs the processor to determine the variability in number of samples remaining in the queue of the consuming device; and to determine if the remaining number of samples in the queue of the consuming device can be reduced based upon the variability and if so reducing the queue.

Another aspect of the present invention can be characterized as an audio and video consuming apparatus capable of dynamically reducing latency of data blocks received from a communications network, the apparatus including a processor, wherein the processor includes a memory and peripherals in communication with and controlled by the processor. The apparatus is capable of at least one of sending, receiving and consuming data blocks. The apparatus also including a software product, wherein the software product is capable of instructing the processor to execute instructions to:

a) determine completion of processing of a next data block; b)determine a number of samples remaining in a queue of said consuming apparatus of the next data block; c) determine variability in the number of samples remaining in the queue of said consuming apparatus; and d) determine if the remaining number of samples in the queue of said consuming apparatus can be reduced based upon the variability.

Another aspect of the present invention can be characterized as a method for determining bias in an audio/video consuming device, the method including polling a consuming device for number of samples consumed between a plurality of time intervals; and comparing the number of samples consumed to a calculated number of samples that should have been consumed between the plurality of time intervals based on the consuming device set consumption rate.

Figure 9:
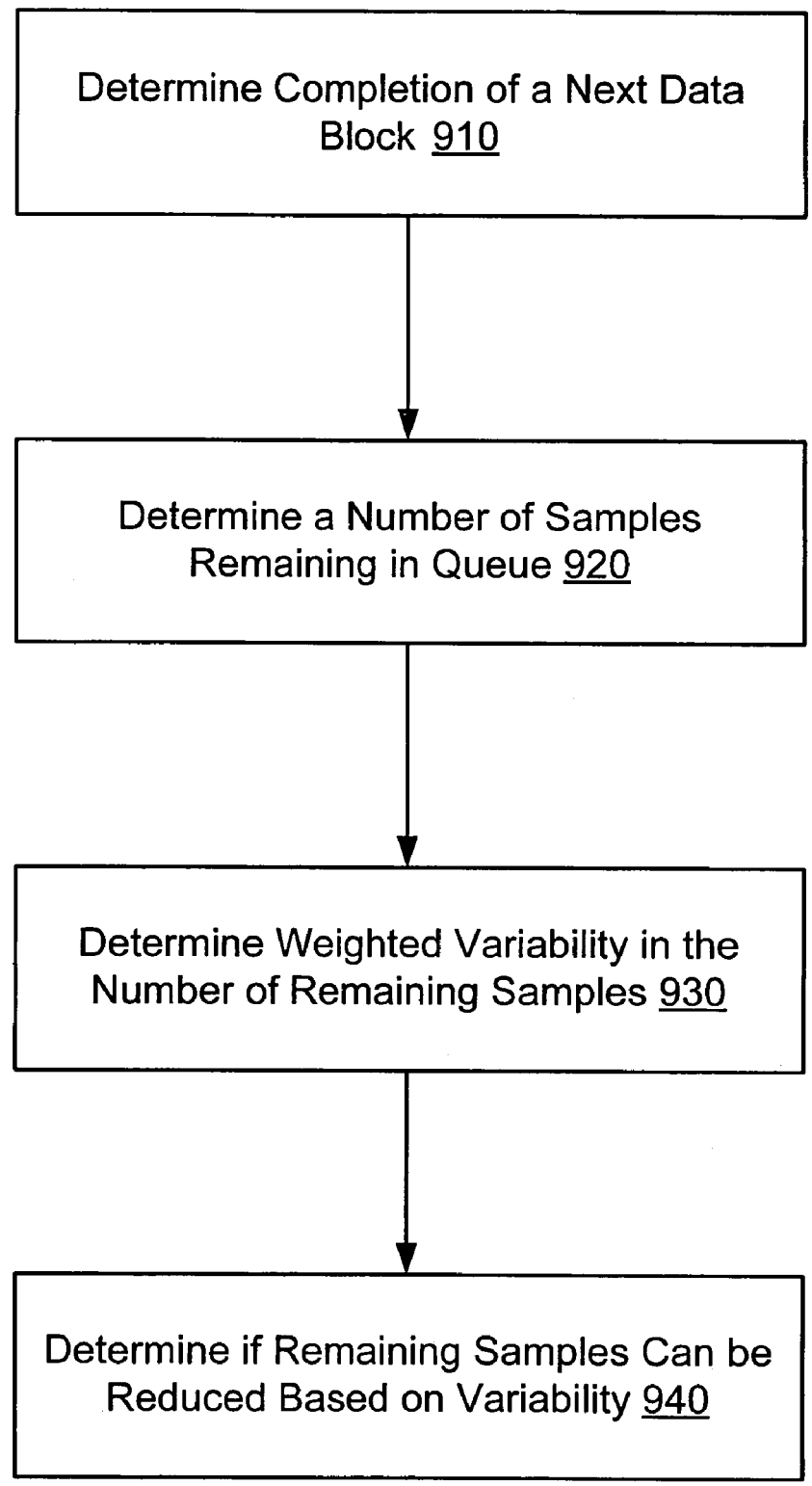
FIG. 9 is a flow diagram illustrating an embodiment of the invention.

FIG. 9 is a flow diagram illustrating an embodiment of the invention. This embodiment describes a method for reducing latency over a communications network. The method includes determining completion of processing of a next data block 910. The number of samples remaining in a queue of a consuming device of the next data block is then determined 920. The method further includes determining a weighted variability in the number of samples remaining in the queue of the consuming device 930. Once the variability has been determined, a determination is made as to whether the remaining number of samples in the queue of the consuming device can be reduced based upon the weighted variability 940. In one embodiment, if it is determined that the number of samples can be reduced, then the number of samples is reduced by discarding samples of a data block.

Figure 2:
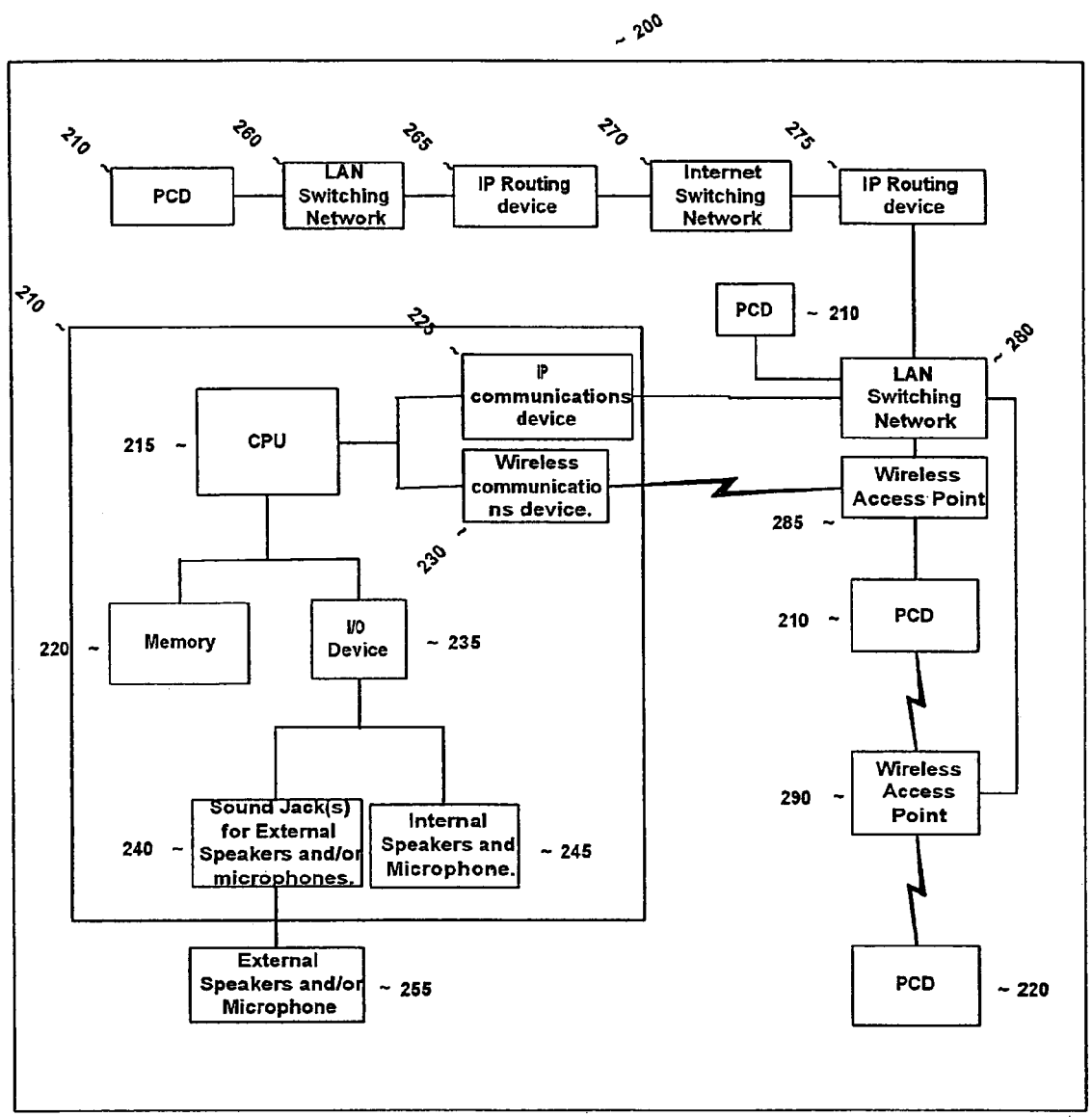
FIG. 2 is a data block diagram illustrating a general physical environment for supporting wired and wireless IP telephony.

FIG. 2 depicts a general system architecture 200 for wired and wireless IP telephony. The environment consists of multiple personal communication devices (PCDs) 210 comprising various components that process sound or video. PDC 210 includes a CPU 215 having memory 220 in communication with and IP communication means 225, nominally a LAN Media Access Card (MAC), a wireless communications means 230, which is nominally a IEEE 802.11, Bluetooth, IR or similar compliant standard. The communications means may include LAN, Internet, and other wireless devices.

The PCD 210 further includes an I/O port 235 for audio or video importing and exporting, audio jacks 240 and optionally internal speakers and/or microphone 245, which are all in communication and controlled by CPU 215. The PCD 210 may also include external speakers and a microphone 255.

Interactive sound communication occurs in a path from the microphones of one PCD 210 to the speakers of another PCD 210, and vice-versa. Each component may contribute to latency. In addition to the physical components shown in FIG. 1 and FIG. 2, there may be software components that may also contribute to latency, such as sound codecs (coder and decoder).

In a typical operation, the PCD 210 connects via a LAN switching network 260, such as an Ethernet switch or hub or similar type network device. LAN 260 is normally connected to IP routing means 265, such as a standard IP standalone router or a PC or similar device configured for routing. The IP routing means 270 is in communication with a communication switching network means, such as the Internet or other communications network which is further in communication with IP routing means 275. As depicted in FIG. 2 the PCD 210 can be connected to a LAN 280 or wireless access point 285 and 290 either hardwired or via a RF connection.

There are several sources of latency in IP telephony. Some sources are completely within the endpoint devices, and others are external to the endpoint devices. One aspect of the present invention is to minimize latency contributions from sources that are directly under the control of the end point devices, and to manage effectively all remaining causes of latency. Identifying the sources of latency is quite easy (every device and piece of code that processes the sound or sound data from its creation to its consumption), however, some of these devices are miniscule contributors in comparison to others. In order to effectively control or minimize latency it is important to understand the mechanisms that produce latency as well as the nature of human perception of latency.

Although the detailed description that follows is directed towards IP telephony, reader should note and a person of ordinary skill in the art should readily realize, that the techniques and methods described are equally applicable to a digital video stream, an audio/video data stream, data stream or any system in which the end device receives the data for visual or auditory consumption.

In the following description the term 'sample' is defined to mean an audio sample when referring to an audio data block and a frame when referring to a video data block.

Some common characteristics of sound and video communication over IP apply to all significant contributors to latency. By understanding such latency contributions a model can be created for further analysis of latency. The fundamental characteristics to be accounted for are:

1) audio and video or transmitted in datagrams, chunks, data blocks, IP packets or segments;

2) audio and video data blocks require time to transmit on any wired or wireless connection;

3) audio and video data blocks are typically transmitted or otherwise transferred from one device to another only after being fully received and verified;

4) audio and video data blocks are queued for transmission or transfer at most devices;

5) audio and video data blocks can be lost in transmission;

6) audio and video data blocks have considerable overhead that can be a large percentage of the total cost of transmission when the audio data blocks are short (i.e. small in comparison to the overhead); and 7) compression of audio and video is most efficient when it is performed in large data blocks.

As previously stated the present invention contemplates and works equally well with video data blocks or a combination of audio and video in any setting in which latency is problematic. If a reference is made to video or audio data blocks alone it is intended that the absent reference be covered, unless specifically stated otherwise.

A first fundamental characteristic of IP audio or video communication is that audio is transmitted in data blocks, segments, data packets or data chunks. The data blocks typically are compressed via a host of various compressions algorithms and routines. The data blocks can and do vary in size. The size of a data block is measured commonly in bytes and is dependent on the compression algorithm used, if any; the amount of information contained within the data block (some data blocks contain more information than others and are therefore less compressible); the duration of sound data block (typically measured in milliseconds or in samples at a particular sample rate); and the fidelity of reproduction that is being achieved in an audio, video or audio/video environment. The latency contribution of a device in the path of the data block transmittal, from its creation to its consumption, is a function of the characteristics of the data blocks (i.e. compression algorithm used, size of the data block, overhead, etc.).

A second fundamental characteristic of IP audio or video communication is that data blocks require a certain amount of time to be transmitted from one device to another as they travel from source to destination. Not all physical links in the path from source to destination are equally fast and therefore make unequal contributions to latency. For example, the slowest links are typically modem links to home computer systems and of course contributes the lion share to the total latency.

A third fundamental characteristic of IP audio or video communication is that the addressable devices (devices that have an IP address and appear in the route as routing devices) and many other devices (including switches that may not appear as routing devices) will not begin transmission of a data block to its next destination until the entire data block is first received and typically verified. For example, within the Internet it is not uncommon for 20 such addressable devices to appear on the path, with several additional unaddressable switches or hubs that are not seen in a route listing but also exhibiting these same characteristics.

A fourth fundamental characteristic of IP audio or video communication is that delay over the Internet can be arbitrarily large, even with devices operating normally and no packets or data blocks being lost. Device queues are intended to smooth out transient or momentary overloading of capacity so that the devices can achieve their full throughput even though data blocks arrive randomly according to some statistical distribution. Consequentially, there is a need to smooth out the load to avoid unnecessary dropping of data blocks.

Queues or data buffers are also components of end point computer equipment, such as in audio or video cards or audio or video card drivers, as well as transmission queues for IP transmission out of or into the end point devices. The length of these queues can be affected by CPU and memory bus scheduling as well as by loads on transmission lines. Queues are significant contributors to latency and can be highly variable in length.

A fifth fundamental characteristic of IP audio or video communication is that data blocks can be lost. When queues are too large in a particular device, it will typically drop data blocks from the queue and the blocks that are not recovered just disappear. This typically happens when the latency has exceeded a maximum predetermined limit, usually >250 ms. For latency levels of 250 ms or greater, the user in a real time or near real time conversation notices the delay. In an audio setting the communication begins to take on a walkie-talkie feel. Once latency is present it will persist and can only be overcome by taking some action, such as deleting (i.e. dropping data blocks) sufficient data blocks from either the consuming device (i.e. audio, video or audio/video player) queue or data blocks transmitted to the end device and not yet in the consuming device queue, to once again come within the design parameters, usually a latency level of <200 ms. It should be noted that a consuming device may have multiple buffers. All buffers allocated to the consuming device are considered part of the consuming device queue. The allocated memory amount can be changed during operation of the device.

Data blocks may also be corrupted in transmission and be lost. Losses contribute to latency if there is a requirement of lossless transmission; because the time required to request and receive retransmission of lost data blocks of course is added to the latency. The latency that this causes is generally considered unacceptable. Therefore, for IP telephony and standard telephony such losses are accepted and the receiving equipment must deal with missing data blocks. It is possible to reduce the occurrence of such missing data blocks by sending information redundantly, which increases the bandwidth cost of the transmissions as well as attendant latency.

In the present invention, and for most purposes of telephony, redundant transmission techniques are not considered to be the most desirable. Nevertheless, an embodiment of the present invention does contemplate the use of such redundant techniques and mechanisms and such a system will benefit from the teachings of the present invention.

The interactions between the second and third characteristics listed above greatly contribute to latency. At each node the time of transmission on the incoming link is added to the latency because the third fundamental characteristic requires that nothing be transmitted out until the entire data block is received. For example, assume that a slow modem link is the link of interest and that it is barely able to carry the bandwidth offered in the sound data blocks. If the sound data block contains one second of sound, it will require almost one second for it to be transmitted completely. This will add therefore one second to the latency just from that link. The next link will presumably be much faster, and will contribute its corresponding transmission time to the latency. This process is repeated in each switch and routing device on the Internet or communications network until the data block is received at its destination. Thus, the total delay or latency can be considerable.

The present invention minimizes this effect. The general mechanism is to send packets as small as is reasonable. As is well known, each data block, data segment or packet includes a header, which is part of the overhead of transmitting the packet. Small packets headers are the same size as large packet headers, thus the cost of transmission goes up while latency is reduced by utilizing smaller packets. Reduction in packet size is limited the effects of fundamental characteristic 6.

Fortunately, the Internet infrastructure, over time, has been constructed with ever-faster transmission media, now often consisting of very fast fiber optic links, so that this particular latency contribution is becoming smaller over time, and is often insignificant, and generally, only the queuing latency need be considered. On the periphery of the network where the slowest links are encountered, the contribution still remains significant. Each data block will typically go through two relatively slow 'last mile' links on its way to its destination.

In the further detailed description, waypoints are defined to be any connection or device utilized to transfer data blocks from one point to another. The waypoint may be one of, but is not limited to, a hub, router, repeater, switch, PBX, codec, modem or end device. Waypoints which store, queue, and forward the data blocks to one another connect via a WAN, LAN, Internet, wireless connection or communication network until the final waypoint (i.e. end device) is reached. It should be noted that waypoints are not limited only to network communication nodes or devices, since some waypoints are components within the end nodes or device. These special waypoints perform a function other than passing the data blocks along. For example, an audio or video I/O card, or its drivers, are advantageously modeled as waypoints as is the coder/decoder (codec).

Each waypoint has a queue of data blocks that has a minimum length and a maximum length. If the predetermined maximum is exceeded, data blocks are generally dropped or somehow processed so as to keep the length below that maximum threshold. The minimum length is the length that must be exceeded before the waypoint will transmit the data block at the head of the FIFO queue. A data block that is being transmitted is not considered to be in the queue; so a waypoint may have a maximum queue length of 0, but the smallest practical maximum queue length is 1. Clearly the maximum must be greater than or equal to the minimum.

For a particular communication path with n connections $C_n$ there are n destination waypoints $W_n$. The connections may be wired, fiber optic, or wireless; and connection $C_i$ connects waypoint $W_{i-1}$ to waypoint $W_i$. The initial connection has no source waypoint, it may be thought of as the source of the audio or video. For each connection $C_i$ there is a characteristic transmission rate $t_i$, which is given in bits per second in this embodiment of the present invention. The waypoints have the following fixed quantified characteristics:

$I_i$ is defined as the minimum length of a queue in waypoint $W_i$ before a first received stored data block at the waypoint will be transmitted or conveyed to the next waypoint.

$h_i$ is defined as the maximum length of a queue in data blocks in waypoint $W_i$.

The waypoints have a dynamic characteristic (i.e., dependent on time) which is the length of the queue in data blocks, $q_i$. The data blocks for a particular transmission conveyed on a connection $C_i$ have a fixed length in terms of the time of the audio or video that they represent, which is measured in milliseconds and is represented by $d_i$. The total bits required of the data block is represented by $b_i$. The value $d_i$ is the duration of audio or video data blocks as they are played out on the receiving end by the playing or consuming device, such as a speaker, monitor, PDA etc. When a waypoint is a compression coder/decoder (codec) it is possible for the incoming bit size to be different from the outgoing bit size while the milliseconds of sound represented might be the same. It is also possible for a particular waypoint to collect the sound on its input with a millisecond length other than the one it transmits. For example, some audio cards in combination with their drivers will collect 50 or so milliseconds of audio prior to transmitting it to the receiving object, regardless of the requested size being much smaller than 50 milliseconds. Thus if 10 millisecond data blocks are requested, 5 buffers (data blocks) of audio could be delivered in quick succession every 50 milliseconds.

For simplicity, it is assumed that the sound compression rate is fixed, i.e., that a data block of audio or video of a set number of milliseconds will always require the same number of bits to represent in compressed form, regardless of the characteristics of the audio or video being compressed. With this assumption, the fixed or non-dynamic contribution of a waypoint i where i is greater than 1 in conjunction with its incoming connection is given by Eq. (1) as follows:

$$l_i d_i + (b_i/t_i) \quad \text{Eq. (1)}$$

For the initial connection to the initial waypoint, the contribution to latency is simply $d_0$ since the rate of consumption is exactly the rate of production of the sound. Thus, the size that the sound device collects before it may convey the sound to the next waypoint (which is perhaps the codec), is a direct contributor to latency. The fixed latency then is defined by Eq. (2) as follows:

$$W_{dynamic} = \sum_{i=1}^{n} ((q_1 - l_i) d_i) \quad \text{Eq. (2)}$$

The dynamic contribution to latency is based on the length of the queues, over and above the minimum length. Thus the dynamic latency is defined by Eq. (3) as follows:

$$\omega_{fixed} = d_0 + l_1 d_1 + \sum_{i=2}^{n} \left(\frac{b}{t_i} + l_i d_i\right) \quad \text{Eq. (3)}$$

For most waypoints the minimum length of the queue is zero. Transient conditions on the path contribute greatly to the dynamic latency, which is typically quite variable. The dynamic queue lengths ($q_i$-$l_i$) can be thought of as random variables that are not independently distributed but which are affected by independent random events. They are not independently distributed because the queue lengths depend on the behavior of all devices in the path. For example, a device sending data blocks to another has an effect on the queue length in the destination device.

An aspect of the present invention is to determine a queue length at the final destination that is sufficient to handle the entire variability of queue lengths over the transmission path, but which are no longer than that. A queue length selected too small will be forced to drop data blocks needlessly, whereas a queue length larger than necessary increases latency. Furthermore, it is desirable to dynamically adjust the maximum length of the final queue based on the history of queue lengths so as to minimize the user's opportunities to perceive either high latency or alternately poor audio or video quality due to running out of audio or video to play back or be consumed by the end device.

As previously stated, the latency on a path across the Internet or communication network even between one computer and another connected across a LAN is extremely variable. A significant portion of the variability is caused by transient conditions. Thus, queue lengths grow and shrink dynamically across the path, with last queue generally taking up the slack. If the last queue length becomes zero because the device has consumed the data in the queue, the latency grows by the amount of time that there is no data to consume or play to the end user.

Variablility can be calculated in many ways as a person of ordinary skill in the art will readily appreciate. The present invention teaches and contemplates dynamically reducing latency via any method of variability calculation. This includes, but is not limited to a statistical variance or a stochastic model of calculating the variablility. Variability further includes weighted averages, wherein the calculated variability measure is capable of being a fraction or a multiple of the variability measure. Additionally the variablility can be calculated over the entire history of the transmission or over a predetermined window, weighted to give more consideration to recent events. Variability in prior art, also sometimes called jitter, is a measure of the differences in the inter-arrival times between packets at the final network destination. Variablility is simply defined as the differences, or a measure of differences, in the queue length of the consuming device when data blocks are fully processed or otherwise ready to be consumed by the consuming device, which is a component of the final network destination.

If it is assumed that no packets are lost, and that audio production clocks exactly match the sound playback clocks, as does the RTP (i.e. sample rates on input exactly match sample rates on output), then the latency will be exactly the sum of the periods when audio or video was not being played at the destination starting at the moment when audio or video first started to be captured at the source. This process results in ever-longer queues at the final output device since the conditions that caused them are transient in nature.

The present invention provides for a method for providing low latency dynamically by shortening the length of the queues on the final waypoint (the output device). An embodiment of the present invention provides for queue length growth and increased maintenance at that queue size for longer periods during unstable transient conditions. It should be noted that queues should not be shortened too quickly as the transient conditions abate, which could result in the device again running out of sound. Shortening of the queue should generally occur only after observations have been made indicating that a lower latency can be supported for a significant period of time.

In the present invention, the same or similar means that dynamically calculates and adjusts for lower latency in the system also adjusts for jitter, which is sometimes narrowly defined as the statistical variability of the arrival times for data blocks during steady state conditions. Jitter is sometimes defined to also include the problems associated with audio or video production being slower or faster than the final device consumption of it. This is unavoidable since the consumption runs on an independent clock from that of the producing device.

If jitter were the only phenomenon, then simply finding a good length for the queues that would be maintained statically would suffice. If the queue were to exceed that chosen length, then it would be shortened. Optionally, if it became shorter it could be lengthened by some digital signal processing means. Otherwise it could be allowed to run. But this is not the case. The present invention provides for a method that accounts for jitter, but which also accounts for changing conditions across the path that results in highly variable latencies, especially transient increases in latency, that can be adjusted for during the transient condition, and then re-adjusted for as soon as the transient condition abates. This is achieved in the present invention via dynamic queue management after all contributors to latency, as described above, have been aggregated.

Because the queue lengths are somewhat independent in the devices in the path as described earlier, management of queue lengths should preferably occur mainly at the last possible point, or after any possible contributor to latency has been passed. This is far superior to management of queue lengths at intermediate points except under exceptional conditions where data blocks must be dropped to prevent overflowing queues. A simple statistical or stochastic model based on the foregoing analysis shows that attempting to manage queue lengths at multiple locations would likely lead to greater latency and certainly could not lower latency effectively. In particular, management, even at end points in the communication protocols, prior to the contribution of decoding and encryption steps to latency, is not prudent.

The output queue length in the output device can be determined on most audio and video playback machines from software. This typically consists of a parameter returned from a function call that identifies the number of played sound samples in the output device since beginning that output. Output devices sometimes generate a bias over time and report positions that are behind the actual position at the time of the function call. This results in a perceived queue length that can exceed greatly the actual length. This phenomenon can be thought of as a defect in the equipment or the software controlling it, but it occurs over a wide range of popular audio and video I/O equipment. The present invention includes means to minimize the effects of this defect by accurately estimating the bias.

Bias depends on the device but is not fixed in all devices, so if the queue length is to be known, then the reported queue length must be adjusted for the bias of the reporting device to get the real queue length. The adjustment should be performed based on a steady state operation of the device when passing data blocks to the output device at intervals corresponding to the expected intervals of receiving audio or video data blocks from the transmitting device.

Figure 3:
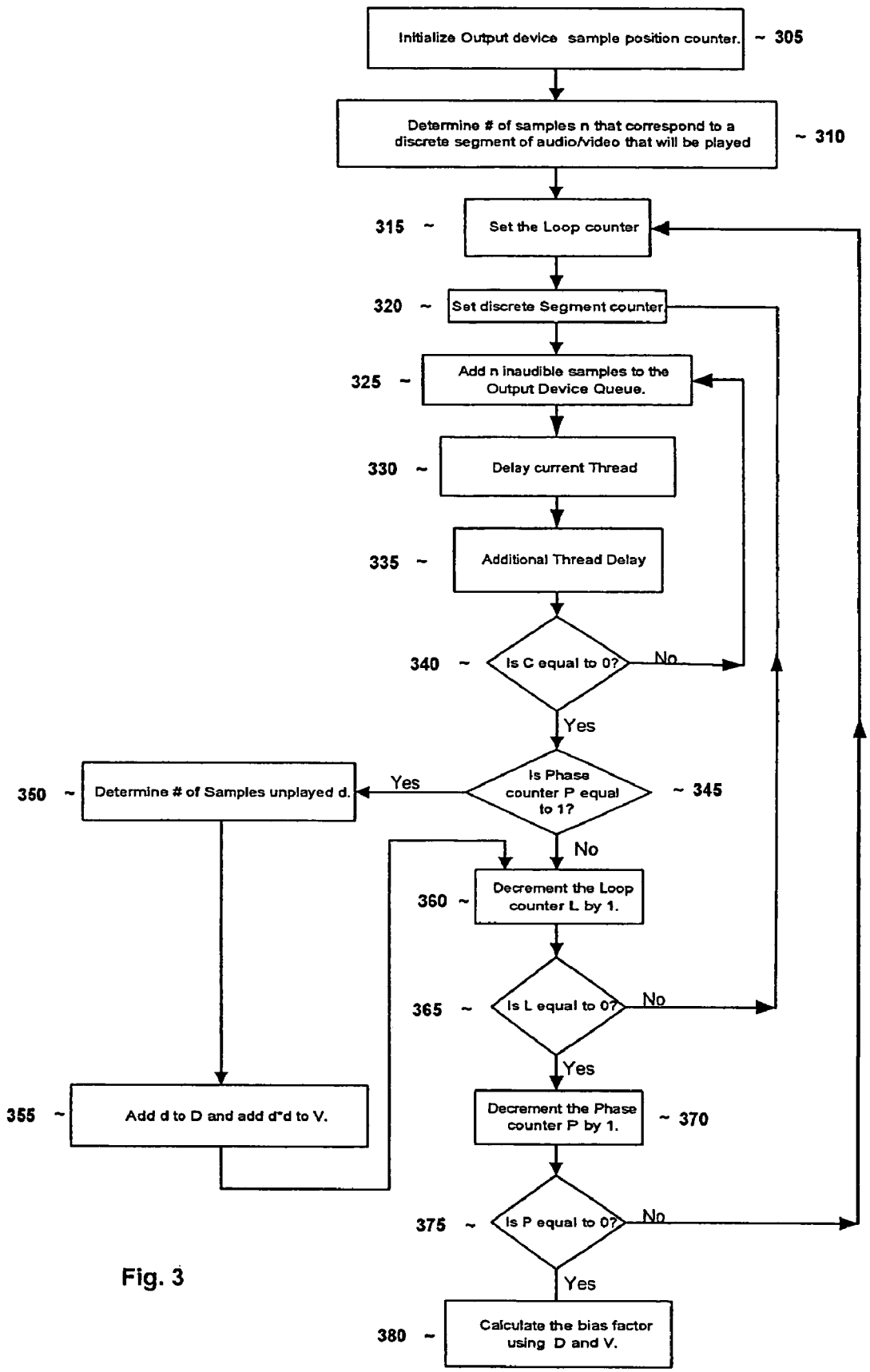
FIG. 3 is a flow chart illustrating bias factor determination in accordance with an aspect of the invention.

FIG. 3 is a flow chart illustrating a bias factor determination in accordance with an aspect of the invention. To obtain the sound sample queue length bias the sound device is probed repeatedly to obtain several samples of steady state bias. The bias should be observed in essentially the same environment that the sound device and drivers operate, including the load on the output device. In other words, if 10 millisecond data blocks are to be delivered when processing sound to the device, then the probe will send 10 millisecond data blocks to the device. By precisely timing the sending of the data blocks, it can be determined that the queue length should be approximately zero (the difference indicating the bias). The probes preferably occur in close sequence, and the values obtained from the first probes are generally not used so that the device and driver may settle down. Several results are averaged and the standard deviation taken, then the average is added to twice the standard deviation to obtain the adjusted bias value.

As illustrated in FIG. 3, at step 305 the output device is opened and the audio or video or both the audio and video components are initialized and sample position counter is set, typically to zero. At step 310 a determination is made regarding the number of samples n that correspond to a data block of sound that is expected to be played out or consumed. A determination is further made at this step of the number of microseconds, kept in variable m, required to play that audio or video at the devices playback rate. Numeric variables are set to a predetermined number, in this embodiment variables D and V are set to 0. The variable D accumulates the sum of the unplayed sound observations. Note that each such observation should have been 0. The variable V accumulates the square of each such observation. Variables D and V are used to calculate the average and standard deviation in the observed offsets. A phase counter P is set to 2 in this embodiment and the total number of samples written W to 0. It should be noted that the variable names and numbers could be set to anything the reader desires as long as the underlying means and principles of calculating the bias is maintained.

At 315 a loop counter L is set to 10 and at step 320 a data block counter C is set, in this example, to 5. Control passes to step 325 wherein a writing of blank (inaudible or black screen) audio/video samples of length n is performed. At this step counter C is decremented by 1 and n is added to the number of samples written W. At step 330 a current thread is slept (i.e. delayed) m/2 microseconds approximately. This prevents the thread associated with this operation from hogging the CPU time and to more closely simulate an actual usage of the device.

At step 335 a tight busy-wait loop is entered which incorporates a further delay in current thread by an additional m/2 microseconds so as to make the total wait since last write exactly equal to (as near as programmatically possible) m microseconds. A busy wait can be implemented by querying the timer repeatedly until the time is up. At step 340 a determination is made as to whether counter C is equal to 0. If not, the process loops back to step 325 and continues on from that point as described above. If the determination is that counter C is equal to 0 the process passes control to step 345 where it is determined if phase counter P is equal to 1.

If at step 345 the determination is that P is equal to 1, the process proceeds to step 350 where a request is made to the system regarding the number of samples played p. W−p=d ((number of samples written)−(number of samples played)) is calculated. Control then passes to step 355 wherein the difference d is added to D and d*d is added to variable V. Control then passes to step 360 and continues from there as described below.

If at step 345 the Phase counter P is not equal to 1, control passes to step 360, where loop L is decremented by 1. At step 365 a determination is made as to whether loop L is equal to 0. If the result is negative, control passes back to step 320 and continues from there as described above. If the determination at step 365 is affirmative control passes to step 370 where Phase counter P is decremented by 1. Control then passes to step 375 where a determination is made whether P is equal to 0 or not. If P is not equal to 0 control passes to step 315, wherein the process proceeds from that point as described above. If P is equal to 0, control passes to step 380 wherein an average bias is calculated.

At step 380 the average bias B is calculated by dividing (the number of loops or data points taken, in this example 10) into D and calculating of the standard deviation S of the bias B by taking the square root of $\{(V/10)-B*B\}$. A bias factor variable <biasFactor> is also calculated in this embodiment as B+2S. The bias factor is the estimated bias plus two standard deviations in the samples used to estimate the bias. It should be noted that persons of ordinary skill in the art can modify the above bias factor calculation and achieve substantially similar results and still fall within the scope and teachings of the present invention.

While the bias may be viewed as a defect in the audio and video handling software or hardware of the output device, it is pervasive and needs to be addressed. Prior art ignores this condition and, thus promotes inaccurate sizing of device queues. The reader should note that some devices that may be used for audio and/or video I/O may not have this bias. An aspect of the present invention is that it estimates the bias, and where there is no such bias, it estimates a bias value as approximately zero; in which case the bias component can be excluded from the calculations and evaluations of queue size and length without substantially affecting the outcome of the calculations.

Figure 4:
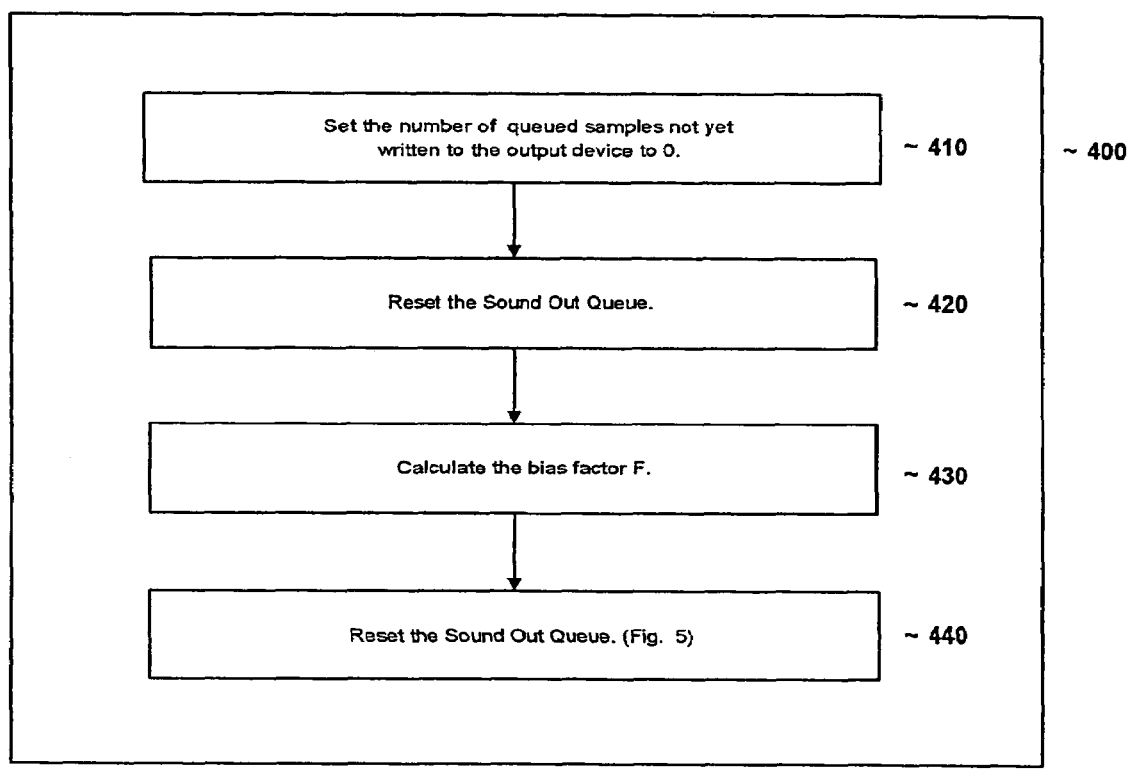
FIG. 4 is a data block diagram representation of a process flow for initializing a sound out queue in accordance with the present invention.

FIG. 4 illustrates initialization of a sound output queue and will be described at this time. It defines several constants and describes the usage of certain variables throughout the execution of the present invention.

The steps to Reset Sound Output Queue 400 are as follows. At step 410 the number of queue samples not yet written to the consuming device R (i.e. output device or video/audio player) is set to 0. In this embodiment a manifest constant <MULT> is set to 128, wherein manifest constants <ROUND> and <SCALER> are calculated as follows:

<ROUND>=<MULT>/2 which is 64; and
<SCALER>=<MULT>−1 which is 127.

Set variable <buf_samples> to the number of samples of sound that are represented in a single data block in transmission. Note that this value could be variable but it is, in the this embodiment, fixed. This variable is dependent on the sample rate and the nominal number of milliseconds of sound in a data block, in the present embodiment it is a power of 2. For example if the sample rate is 11,025 per second, the value is 256, or approximately 23 milliseconds of samples. Let variable <microSecData block> be the number of microseconds of sound in a data block, datagram, chunk or packet. Let variable <CurrMicroseconds> be the number of microseconds the system has been running and is generated, or determined, each time variable <CurrMicroseconds> is used in the algorithm.

Figure 5:
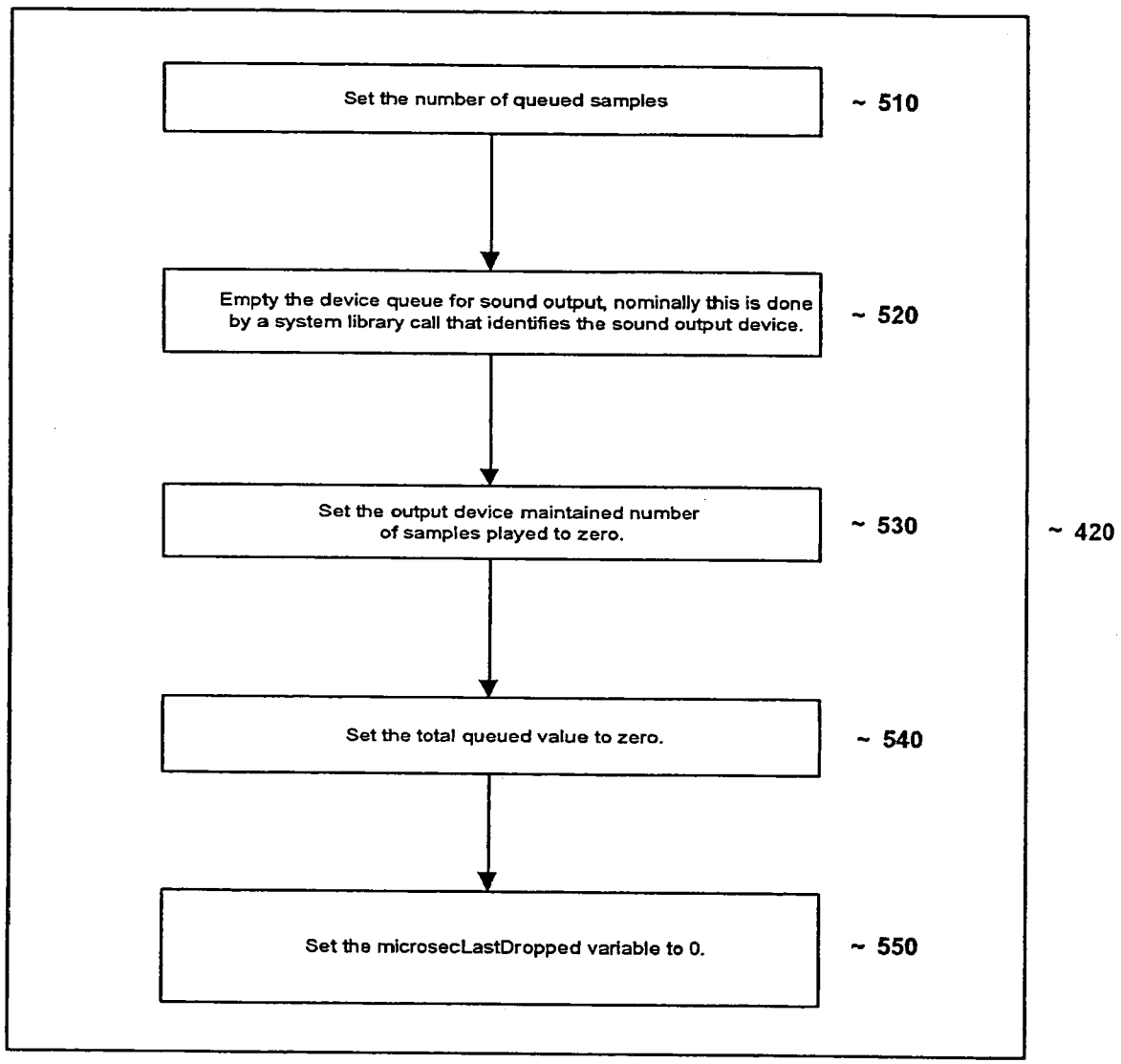
FIG. 5 is a data block diagram representation of a process flow for resetting a sound out queue in accordance with the present invention.

At step 420 a resetting of the Sound (or Video) Out Queue is performed as illustrated in FIG. 5 and will be discussed in detail later. The process then proceeds to step 430 wherein the bias factor, variable <biasFactor>, as illustrated in FIG. 3 and described above is determined. Control then passes to step 440, wherein the Sound Out Queue is reset once again.

FIG. 5 illustrates resetting (which should occur twice during initialization) of the Sound Output Queue 420. This procedure is used to recover from certain error conditions as well as to contribute to the general initialization of the queue.

At step 510 set the number of queued samples variable <queued> to R, where R is the number of queued samples not yet written to the output device. On initialization variable <queued> is set to 0 since R is zero. At step 520 the device queue for sound output is emptied, nominally this is done by a system library call that identifies the sound output device. At step 530 set system maintained value variable <position>, which is the cumulative number of samples played, to zero by a system library call. Note that variable <position> may, with perhaps less accuracy, be maintained by the application. E.g., as the size of the buffers times the number of buffers currently in the output device queue (not yet returned to the application by the system).

On some systems the latter scheme may be beneficially used to maintain the value of variable <position> because a particular embodiment of the present invention may not be supported. If the latter method or its equivalent is used then the value P can be set to zero. On some systems there may be a value retrievable from which the variable <position> can be calculated. The length of the queue could be directly accessible on some systems, and on such a system that value would be used beneficially in the obvious way.

At step 540 set variable <total_queued> to 0 and at step 550 variable <microsecLastDropped> is set to 0. MicrosecLastDropped is defined to be the number of microseconds the system had been running when the last data block was dropped from the queue for playback. It is set to 0 until an actual dropping of a data block occurs.

Figure 6:
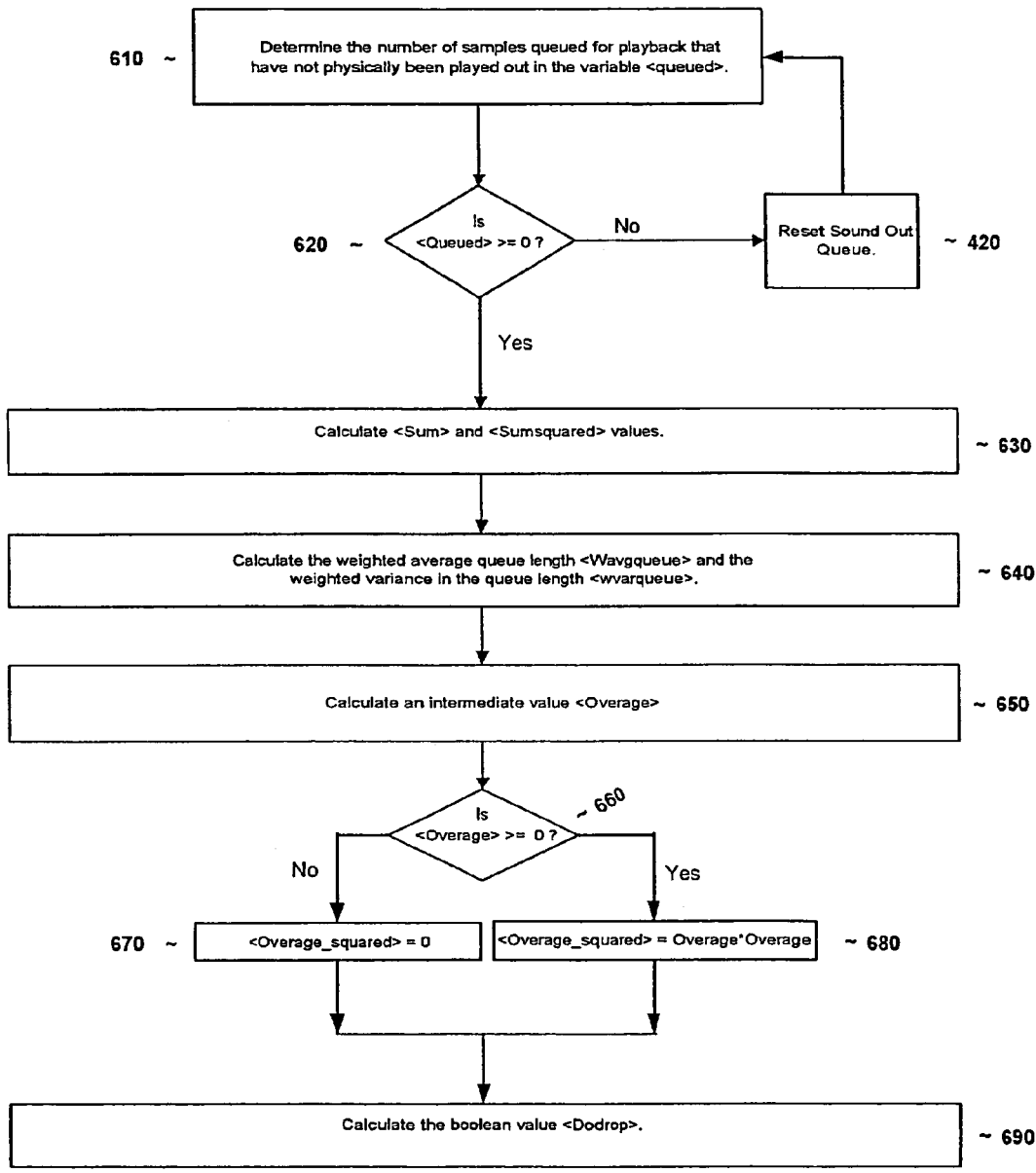
FIG. 6 is a flow chart illustrating data block disposition determination in accordance with an aspect of the present invention.

FIG. 6 illustrates a process for determining whether a data block is to be played out, queued for output, or to be ignored.

At step 610 the number of samples queued for playback that have not physically been played out is determined and stored in the variable <queued>. This operation nominally involves knowing the number of samples totally that have been at any time queued, variable <total_queued>, and determined from a system call that obtains the total number that have currently been played, variable <position>. Variable <queued> is calculated as variable <queued>=variable <total_queued>−variable <position>. At step 620 it is determined if variable <queued>>=0, if it is less than 0, which is an error condition, control passes to step 420, where the sound out queue is reset and control then passes to step 610, as described above, if greater or equal to 0 control passes to step 630 where variable <sum> and variable <sumsquared> are calculated as follows:

Variable <sum>=((variable <sum>*<SCALER>)+
(variable <queued>*<MULT>)+<ROUND>)/
<MULT>. Variable <sumsquared>=((variable
<sumsquared>*<SCALER>)+(variable
<queued>*variable <queued>*<MULT>)+
<ROUND>)/<MULT>. The reader should note
that the divisions and multiplications by
<MULT> can beneficially be effected by shift
operations where <MULT> is a power of 2.

At step 640 a weighted average queue length variable <wavgqueue> and the weighted variance in the queue length variable <wvarqueuee> are calculated by the following formulas:

variable <wavgqueue>=(variable <sum>+
<ROUND>)/<MULT>variable <wvarqueuee>=
(variable <sumsquared>−((variable
<sum>*variable <sum>+<ROUND>)/
<MULT>)+<ROUND>)/<MULT>At step 650
an intermediate value variable <overage> is
calculated as the current weighted average
queue length less the bias factor of and the
length of a data block in samples as follows:

variable <overage>=variable <wavgqueue>−variable
<biasFactor>−variable<buf_samples>.

At step 660 a determination is made as to whether variable <overage> is greater of equal to 0. If no, control passes to step 670, wherein variable <overage_squared> is set to 0 and if yes, control passes to step 680 wherein variable <overage_squared> is set to <overage*overage>. Control then passes to step 690 wherein boolean value variable <dodrop> is calculated by the following formula:

> variable <dodrop>=((9*variable <wvarqueue>) variable <variable <overage_squared>) AND ((variable <microSecData block>/4)= (variable<CurrMicroseconds>−variable <microSecData block>)).

Via some algebra it can be shown that the above formula for <dodrop> determines if the weighted average queue length less the weighted standard deviations, in this instant set to three, is greater than the length of a single data block in samples. If it is then we can safely reduce the queue length by one data block without concern that the queue will run out of sound. The second part of the formula ensures that data blocks are not removed at a faster rate than about one in four, although this number can vary from one in two or three or more depending on the application.

Figure 7:
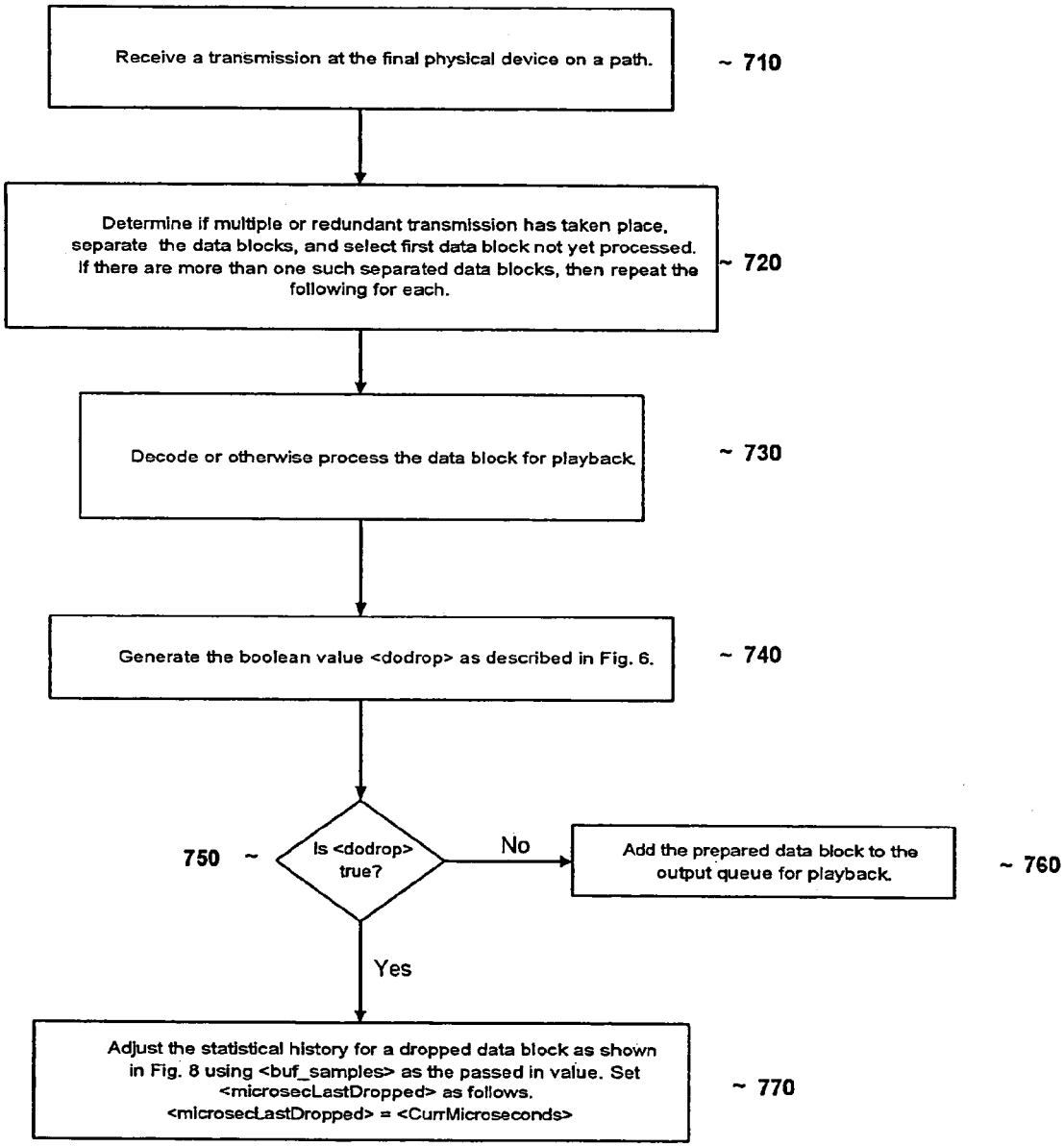
FIG. 7 is a flow chart illustrating processing of an incoming data block of data in accordance with the present invention.

FIG. 7 illustrates processing of an incoming data block or set of data blocks comprising a transmission from the source to the destination. This activity is preferably undertaken whenever a transmission containing sound is received.

At step 710 a transmission is received at the final physical device in a path. (Nominally there are no more LAN or wireless transmission links between this device and the analog playback hardware). This is an externally driven event that passes control to step 720, wherein if data blocks are multiply (perhaps redundantly) represented in this transmission, then they are separated and this process is continued with each data block in order starting with the first data block that has not already been processed from a prior redundant transmission. Redundant transmission is not preferred for most environments, but if encountered the redundant transmissions are removed at this step.

At step 730 the data blocks are decoded or otherwise processed for playback or consumption. Generally at this point in the process, any needed decompression and/or decryption is performed. At step 740 a boolean value variable <dodrop> is calculated as described in FIG. 6. At step 750 it is determined if variable conditions for <dodrop> have been met and if so, control passes to step 760 where a statistical history is adjusted for a dropped data block using variable <buf_samples> as the passed in value. At step 750 variable <microsecLastDropped> is set as follows:

> variable <microsecLastDropped>=variable <CurrMicroseconds>.

If the conditions for variable <dodrop> are not met, control passes to step 770, wherein the prepared data block is added to the output queue of the consuming device for playback.

Figure 8:
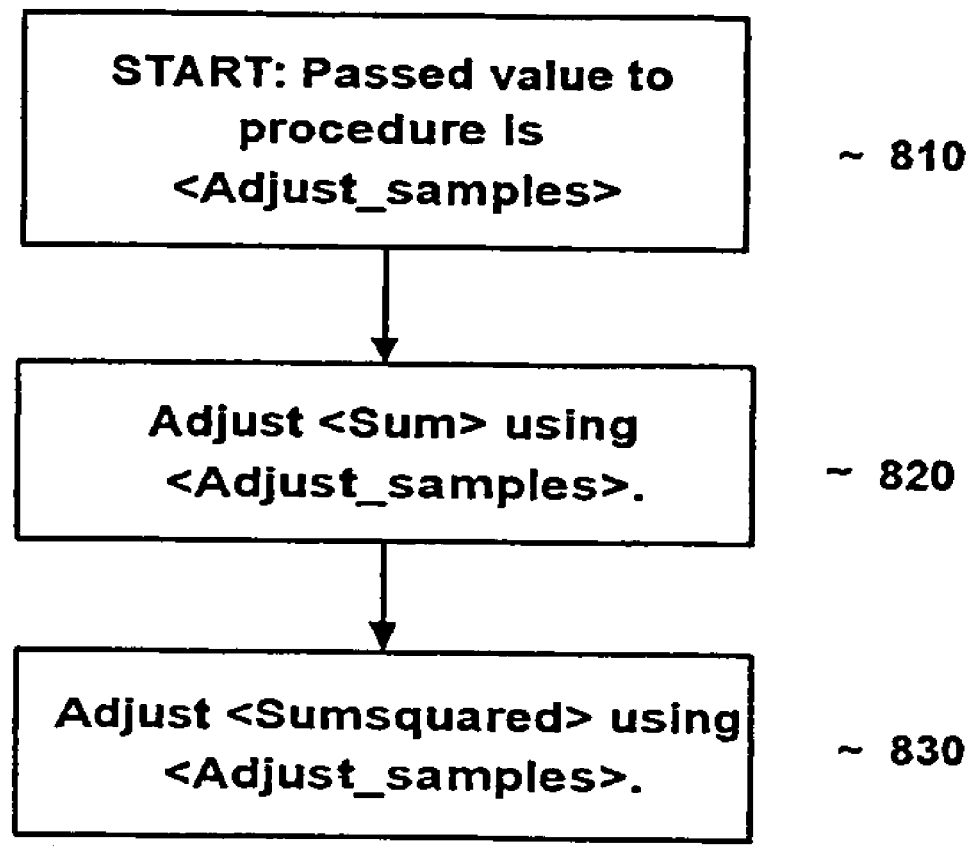
FIG. 8 is a data block diagram representation of a process flow for adjusting statistical history in accordance with the present invention.

FIG. 8 describes adjusting the statistical history to determine the disposition of a data block. Broadly stated, the algorithm adjusts the statistics to correctly present a history after a data block that is correctly received is nevertheless not played out. If a data block is not played out it results in a shorter queue when the next data block arrives, so the statistical history that would have been obtained had the queues been shorter all along in the past is generated.

At step 810 variable <adjust_samples> is passed in to this algorithm. The statistical history is kept in two variables, variable <sumsquared> and variable <sum>. This algorithm adjusts them so that, if the next data block arrives exactly on time, and the playback (sound output) device plays out exactly the expected amount of sound in that interval, then the history will reflect the new variable <sum> and variable <sumsquared> that would have obtained if the queues had been variable <adjust_samples> shorter in length at each time in history that the queue was sampled. This allows shortening the queues to proceed appropriately faster when several data blocks need to be removed in succession. The dynamic queue management algorithm thus more quickly adjusts for transient conditions that create very long queues.

At step 820 variable <sum> is adjusted by the following formula:

> variable <sum>=variable <sum>−(variable <adjust_samples>*<MULT>)If variable <sum> is less than 0 then set variable <sum> to 0.

At step 830 variable <sumsquared> is adjusted by the following formula:

> variable <sumsquared>=variable <sumsquared>− (((2*variable<adjust_samples>*variable <sum>)−(variable <adjust_samples>*variable<adjust_samples>)+ <ROUND>)/<MULT>)If variable <sumsquared> is less than 0 then set variable <sumsquared> to 0.

An overview of the above system and method of the present invention will now be described. Initialization of the queues, as illustrated in FIG. 4, is generally the first activity performed when an IP telephony connection is created. It generally sets the constants used by later algorithm implementations and initializes certain variables. It is preferably called once to set up the queue control mechanism.

The reset of the sound output queue described in FIG. 5 consists of emptying the output device of all queued samples. This is normally done because some error occurred. For example, if the position of the output is reported in advance of the number of samples written out to the device, the sound data blocks already given to the output device driver are discarded and the device position is reset. This same routine also preferably occurs twice at initialization; once before the probe of the bias factor is made, and then again before the received data blocks are first written out to the device.

One variable set at initialization time is of particular interest. It is the bias factor for the sound output device, which is generated by making several probes as depicted in FIG. 3 and the accompanying text. The bias factor is used to adjust the estimated queue lengths and should be obtained while the output device is in an operational mode exactly as it will play sound for the connection. It is calculated from several probes of the output device with calculation of the standard deviation and average for the queue length. The bias is carefully created by duplicating precise timing as would be obtained during a conversation, where it is guaranteed that the queue length is near zero.

However, generally the reported position lags behind and therefore the length be calculated as hundreds of samples. A series of probes is executed to cause the affected elements, such as the output device driver, to settle into a steady state. Then a second series is executed with measurements taken and summed for the length of the queue and the square of the length of the queue for each probe. The average and standard deviation are then calculated and the bias factor is set at the average plus two standard deviations.

As illustrated in FIG. 8 and the accompanying text, statistics are maintained when each data block arrives. A statistical history is maintained as exponentially weighted statistical moments. The weighted sum and the weighted sum of squares of the values are kept. Then, from those values the weighted average and weighted variance are calculated. In the present invention these calculations are efficiently performed using a shift operator rather than a division. Further, the square root does not need to be taken. Instead, since the decision is binary, algebra is performed to allow the comparisons to occur with the variance. So three standard deviations are compared as nine variances.

The derivation is preferably performed as follows. Letting Avg stand for the average weighted queue length, and Sig be the standard deviation, with Bufflen be the length of a buffer in samples, it may be desirable to determine whether the average less three standard deviations is greater than a single data block in length, in which case an entire data block can safely be dropped as defined in Eq. (4) as follows:

$$Avg\ 3*Sig\ Bufflen \qquad \text{Eq. (4)}$$
$$3*Sig\ Avg\ Bufflen$$
$$9*Sig*Sig\ (Avg\ Bufflen)*(Avg\ Bufflen)$$

In Eq. (4), Sig*Sig is the variance (i.e. variablility), so by comparison of the above formula, the square root is avoided, but the comparison is identical to determining that the weighted average less three standard deviations is greater than the length of a buffer. If the result is true, then it is determined that it is safe to shorten the queue by one data block of samples.

It should be noted that a well known general recursive digital filtering technique called a Kalman filter may also be advantageously used to estimate the average and the variance in the sequence of queue lengths. While a general implementation of this would not be as computationally efficient as the preferred embodiment, with appropriate selection of parameters it could allow similar results to be obtained. However, it would be considerably more efficient than calculating the average and variance for each data block independently, as a Kalman filter maintains the history recursively as well.

Returning again to FIG. 7, the general processing of an incoming data block or a set of data blocks is shown if more than one is in a transmission. Broadly, the first determination made for a data block is to decode and/or decrypt it, since this can add latency and variance to the queue. This operation preferably precedes the determination of whether to drop the data block since the time it takes to perform the calculations will result in a lower queue length when the data block is actually available to be played out. The determination of whether the data block will be played, depicted in FIG. 7, may be performed to determine if the data block will actually be played.

In an alternate embodiment, that requires more CPU time, uses techniques known in prior art to resample the sound so as to reduce the number of samples for the next four data blocks, or some other subset of data blocks. This resampling process is used to maintain the frequencies of sound as it is played, as well as to reduce the number of samples. It is also possible to use a data block dropping solution for repeated quick succession dropping of data blocks, and to use resampling to reduce the number of queued samples when fewer samples need to be dropped. While such a process is more costly in CPU time, in some circumstances it produces a superior output.

If the shortening of the queue is expected on the next data block arrival, e.g., the data block is not queued for output, then the statistics are modified appropriately by a call to the algorithm depicted in FIG. 8. As illustrated in FIG. 8 and its accompanying text, the history is adjusted so as to make the history, i.e. the values of the sum and the sum of squares, reflect the values that would have been obtained if the queues had been shortened throughout the entire history by the specified number of samples. This allows the history to be seen as stable at the new average value as it would have been had the adjustment not been made, so that if another queue shortening is in order it can be quickly made. Put another way, direct shortening of the queue should not increase the perception of the instability of the transmission medium. This adjustment avoids that occurrence.

It will be apparent to those skilled in the art that various modifications and variations can be made in the Dynamic Latency Management for IP Telephony of the present invention and in construction of the present invention without departing from the scope or intent of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A method for dynamically reducing latency over a communications network, the method comprising:
   determining completion of processing of a next data block;
   determining a number of samples remaining in a queue of a consuming device of the next data block;
   determining a weighted variability in the number of samples remaining in the queue of the consuming device; and
   determining if the remaining number of samples in the queue of the consuming device can be reduced based upon the weighted variability.

2. The method for dynamically reducing latency according to claim 1, wherein the queue is reduced by increasing rate of consumption of the consuming device.

3. The method for dynamically reducing latency according to claim 1, wherein the queue is reduced by resampling the samples to fewer samples.

4. The method for dynamically reducing latency according to claim 1, wherein the queue is reduced by deleting samples in the queue.

5. The method for dynamically reducing latency according to claim 1, wherein the queue is reduced by discarding samples of a data block.

6. The method for dynamically reducing latency according to claim 1, wherein samples in the queue are deleted if a total number of samples in the queue exceeds a predetermined threshold.

7. The method for dynamically reducing latency according to claim 5, wherein samples of a data block are discarded if the number of samples remaining in the queue is greater than a sum of a number of samples in a data block and the variability.

8. The method for dynamically reducing latency according to claim 5, wherein samples of a data block are discarded if the number of samples remaining in the queue is greater than a sum of a number of samples in a data block and the variability and an immediately preceding data block was added to the queue.

9. The method for dynamically reducing latency according to claim 5, wherein samples of data block are discarded if the number of samples remaining in the queue is greater than a sum of a number of samples in a data block and the variability and if at least one data block over a range of preceding data blocks was not added to the queue.

10. The method for dynamically reducing latency according to claim 5, wherein samples of data block are discarded if the number of samples remaining in the queue is greater than a sum of a number of samples in a data block, the variability and a bias.

11. The method for dynamically reducing latency according to claim 5, wherein samples of data block are discarded if the number of samples remaining in the queue is greater than a sum of a number of samples in a data block and the variability and an immediately preceding data block was added to the queue.

12. The method for dynamically reducing latency according to claim 11, wherein samples in the queue are deleted if a total number of samples in the queue exceeds a predetermined threshold.

13. The method for dynamically reducing latency according to claim 5, wherein samples of a data block are discarded if the number of samples remaining in the queue is greater than a sum of a number of samples in a data block and the variability and if at least one data block over a range of preceding data blocks was not added to the queue.

14. The method for dynamically reducing latency according to claim 5, wherein samples of a data block are discarded if the number of samples remaining in the queue is greater than a sum of a number of samples in a data block and the variability and if at least one data block over a range of preceding data blocks was not added to the queue.

15. The method for dynamically reducing latency according to claim 5, wherein samples of a data block are discarded if the number of samples remaining in the queue is greater than a sum of a number of samples in a data block and the variability and if at least one data block over a range of preceding data blocks was not added to the queue.

16. The method for dynamically reducing latency according to claim 1, wherein the queue is reduced by increasing rate of consumption of the consuming device.

17. The method for dynamically reducing latency according to claim 1, wherein the queue is reduced by resampling the samples to fewer samples.

18. The method for dynamically reducing latency according to claim 1, wherein the queue is reduced by deleting samples in the queue.

19. The method for dynamically reducing latency according to claim 1, wherein the queue is reduced by discarding samples of a data block.

20. The method for dynamically reducing latency according to claim 19, wherein samples of a data block are discarded if the number of samples remaining in the queue is greater than a sum of a number of samples in a data block and the variability.

21. The method for dynamically reducing latency according to claim 19, wherein samples of a data block are discarded if the number of samples remaining in the queue is greater than a sum of a number of samples in a data block and the variability and an immediately preceding data block was added to the queue.

22. The method for dynamically reducing latency according to claim 21, wherein samples in the queue are deleted if a total number of samples in the queue exceeds a predetermined threshold.

23. The system for dynamically reducing latency according to claim 19, wherein samples of a data block are discarded if the number of samples remaining in the queue is greater than a sum of a number of samples in a data block and the variability.

24. The software product for dynamically reducing latency according to claim 1, wherein samples in the queue are deleted if a total number of samples in the queue exceeds a predetermined threshold.

25. A method for dynamically reducing latency over a communications network, the method comprising:
identifying when a data block is ready to be added to a queue of a consuming device;
polling the consuming device and calculating number of samples consumed by the consuming device since previous polling of the consuming device;
calculating a weighted variability in the number of samples consumed by the consuming device; and
determining if the remaining number of samples in the queue of the consuming device can be reduced based upon the weighted variability.

26. A system for dynamically reducing latency over a communications network, the system comprising:
means for determining completions;
means for determining a number of samples remaining in a queue of a consuming device of the next data block;
means for determining a weighted variability in the number of samples remaining in the queue of the consuming device; and
means for determining if the remaining the number of samples in the queue of the consuming device can be reduced based upon the weighted variability and if so reduce the queue.

27. The system for dynamically reducing latency according to claim 26, wherein the queue is reduced by increasing rate of consumption of the consuming device.

28. The system for dynamically reducing latency according to claim 26, wherein the queue is reduced by resampling the samples to fewer samples.

29. The system for dynamically reducing latency according to claim 28, wherein samples in the queue are deleted if a total number of samples in the queue exceeds a predetermined threshold.

30. The system for dynamically reducing latency according to claim 26, wherein the queue is reduced by deleting samples in the queue.

31. The system for dynamically reducing latency according to claim 26, wherein the queue is reduced by discarding samples of a data block.

32. The system for dynamically reducing latency according to claim 31, wherein samples of a data block are discarded if the number of samples remaining in the queue is greater than a sum of a number of samples in a data block and the variability and an immediately preceding data block was added to the queue.

33. The system for dynamically reducing latency according to claim 31, wherein samples of a data block are discarded if the number of samples remaining in the queue is greater than a sum of a number of samples in a data block, the variability and a bias.

34. A computer readable medium having stored thereon a software product for dynamically reducing latency over a communications network, executed by a processor to perform instruction to:
determine completion of processing of a next data block;
determine number of samples remaining in a queue of a consuming device of the next data block;
determine a weighted variability in number of samples remaining in the queue of the consuming device; and determine if the remaining number of sample in the queue of the consuming device can be reduced based upon the weighted variability and if so reduce the queue.

35. The software product for dynamically reducing latency according to claim 34, wherein the queue is reduced by increasing rate of consumption of the consuming device.

36. The software product for dynamically reducing latency according to claim 34, wherein the queue is reduced by resampling the samples to fewer samples.

37. The software product for dynamically reducing latency according to claim 34, wherein the queue is reduced by deleting samples in the queue.

38. The software product for dynamically reducing latency according to claim 34, wherein the queue is reduced by discarding samples of a data block.

39. The software product for dynamically reducing latency according to claim 38, wherein samples of a data block are discarded if the number of samples remaining in the queue is greater than a sum of a number of samples in a data block and the variability.

40. The software product for dynamically reducing latency according to claim 38, wherein samples of data block are discarded if the number of samples remaining in the queue is greater than a sum of a number of samples in a data block and the variability and an immediately preceding data block was added to the queue.

41. The software product for dynamically reducing latency according to claim 38, wherein samples of data block are discarded if the number of samples remaining in the queue is greater than a sum of a number of samples in a data block and the variability and if at least one data block over a range of preceding data blocks was not added to the queue.

42. An audio and video consuming apparatus capable of dynamically reducing latency of data blocks received from a communications network, the apparatus comprising:

a processor, wherein the processor includes a memory;

peripherals in communication with and controlled by the processor, capable of at least one of sending, receiving and consuming data blocks; and a software product, wherein the software product is capable of instructing the processor to execute instructions to:

determine completion of processing of a next data block;

determine a number of samples remaining in a queue of said consuming apparatus of the next block;

determine a weighted variability in the number of samples remaining in the queue of said consuming apparatus; and determine if the remaining number of samples in the queue of said consuming apparatus can be reduced based upon the weighted variability.

* * * * *